US012311289B2

(12) United States Patent
Korten et al.

(10) Patent No.: US 12,311,289 B2
(45) Date of Patent: May 27, 2025

(54) METHODS AND SYSTEMS FOR PROCESSING PHOTOPOLYMERIZABLE COMPOSITIONS

(71) Applicant: Solventum Intellectual Properties Company, Maplewood, MN (US)

(72) Inventors: Malte Korten, Moorenweis (DE); Gioacchino Raia, Tuerkenfeld (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 62 days.

(21) Appl. No.: 18/249,937

(22) PCT Filed: Sep. 29, 2021

(86) PCT No.: PCT/IB2021/058957
§ 371 (c)(1),
(2) Date: Apr. 20, 2023

(87) PCT Pub. No.: WO2022/090831
PCT Pub. Date: May 5, 2022

(65) Prior Publication Data
US 2023/0390673 A1    Dec. 7, 2023

Related U.S. Application Data

(60) Provisional application No. 63/106,478, filed on Oct. 28, 2020.

(51) Int. Cl.
*B01D 21/26*     (2006.01)
*B04B 3/00*      (2006.01)
(Continued)

(52) U.S. Cl.
CPC .......... *B01D 21/262* (2013.01); *B29C 64/124* (2017.08); *B29C 64/314* (2017.08);
(Continued)

(58) Field of Classification Search
CPC ........ B01D 21/26; B01D 21/262; B04B 3/00; B04B 7/16; B04B 7/18; B04B 15/06;
(Continued)

(56) References Cited

U.S. PATENT DOCUMENTS 5,474,719 A * 12/1995 Fan .................. B33Y 10/00
264/401 X
6,572,693 B1    6/2003 Wu et al.
(Continued)

FOREIGN PATENT DOCUMENTS

CN    201423314 Y * 3/2010 ............... B04B 7/16
CN    205871234 U    1/2017
(Continued)

OTHER PUBLICATIONS

Translation of CN 201423314 Y (published on Mar. 17, 2010).*
International Search Report for PCT International Application No. PCT/IB2021/058957, mailed on Jan. 31, 2022, 4 pages.

*Primary Examiner* — Leo B Tentoni

(57) ABSTRACT

The present disclosure provides methods including obtaining an insert comprising a sieve defining openings each having a diameter of 10 to 200 micrometers; placing a volume of a fluid containing a photopolymerizable composition and a contaminant in the insert; and subjecting the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition. Systems are also provided, including an additive manufacturing apparatus, a centrifuge, and an insert configured to be inserted into the centrifuge. The methods and systems can advantageously (Continued)

assist in reclaiming photopolymerizable composition that has been contaminated, for reuse.

17 Claims, 7 Drawing Sheets

(51) Int. Cl.
| | |
|---|---|
| *B04B 7/16* | (2006.01) |
| *B04B 7/18* | (2006.01) |
| *B04B 15/06* | (2006.01) |
| *B29C 64/124* | (2017.01) |
| *B29C 64/20* | (2017.01) |
| *B29C 64/307* | (2017.01) |
| *B29C 64/314* | (2017.01) |
| *B29C 64/357* | (2017.01) |
| *B33Y 10/00* | (2015.01) |
| *B33Y 30/00* | (2015.01) |
| *B33Y 40/00* | (2020.01) |
| *B33Y 40/10* | (2020.01) |
| *B33Y 40/20* | (2020.01) |
| *B33Y 70/00* | (2020.01) |
| *B29B 17/02* | (2006.01) |

(52) U.S. Cl.
CPC ............... *B33Y 40/20* (2020.01); *B33Y 70/00* (2014.12); *B29B 2017/0231* (2013.01)

(58) Field of Classification Search
CPC .......... B29B 2017/0231; B29C 64/124; B29C 64/20; B29C 64/307; B29C 64/314; B29C 64/357
USPC .................. 264/37.18, 401, 494; 425/174.4; 210/360.1, 787; 528/502 D
See application file for complete search history.

(56) References Cited

U.S. PATENT DOCUMENTS

| | | |
|---|---|---|
| 6,730,156 B1 | 5/2004 | Windisch et al. |
| 6,899,948 B2 | 5/2005 | Zhang et al. |
| 9,205,601 B2 | 12/2015 | Desimone et al. |
| 9,360,757 B2 | 6/2016 | Desimone et al. |
| 2014/0203479 A1* | 7/2014 | Teken ................. B29C 64/357 264/401 |

FOREIGN PATENT DOCUMENTS

| | | |
|---|---|---|
| CN | 106640650 B | 10/2018 |
| CN | 208601935 U | 3/2019 |
| CN | 106966566 B | 9/2019 |
| CN | 110271193 A | 9/2019 |
| CN | 111331839 A | 6/2020 |
| EP | 0453588 A1 | 10/1991 |
| EP | 2167013 B1 | 12/2010 |
| EP | 2654412 B1 | 10/2019 |
| JP | 2013112643 A | 6/2013 |
| WO | 2018049302 A1 | 3/2018 |
| WO | 2018231583 A1 | 12/2018 |
| WO | 2019102304 A1 | 5/2019 |
| WO | 2019168807 A1 | 9/2019 |
| WO | 2019213134 A1 | 11/2019 |
| WO | 2019217641 A1 | 11/2019 |
| WO | 2020139858 A1 | 7/2020 |
| WO | 2020157598 A1 | 8/2020 |

* cited by examiner

A) Obtain an insert including a sieve defining a plurality of openings each having a diameter of 10 to 200 micrometers
110

B) Place a volume of a fluid including a photopolymerizable composition and a contaminant in the insert
120

C) Subject the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition
130

FIG. 1

METHODS AND SYSTEMS FOR PROCESSING PHOTOPOLYMERIZABLE COMPOSITIONS

CROSS REFERENCE TO RELATED APPLICATIONS

This application is a national stage filing under 35 U.S.C. 371 of PCT/IB2021/058957, filed Sep. 29, 2021, which claims the benefit of Provisional Application No. 63/106,478, filed Oct. 28, 2020, the disclosures of each of which are incorporated by reference herein in their entireties.

The present disclosure relates to processing photopolymerizable compositions to remove contaminants from the compositions and systems for processing the compositions, such as for use with additive manufacturing techniques.

BACKGROUND

Photopolymerizable compositions have been employed in many industries, including using additive manufacturing techniques. Less than an entire volume of a photopolymerizable composition may be polymerized to form an article, yet the remaining photopolymerizable composition often contains one or more contaminants produced during polymerization processes.

SUMMARY

Methods and systems for processing photopolymerizable compositions are provided.

In a first aspect, a method is provided. The method includes a) obtaining an insert comprising a sieve defining a plurality of openings each having a diameter of 10 to 200 micrometers; b) placing a volume of a fluid in the insert, wherein the fluid contains a photopolymerizable composition and a contaminant; and c) subjecting the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition.

In a second aspect, a system is provided. The system includes a) an additive manufacturing apparatus; b) a centrifuge; and c) an insert configured to be inserted in the centrifuge, the insert comprising a sieve defining a plurality of openings each having a diameter of 10 to 200 micrometers.

The method and system may be useful for removing contaminant(s) from a photopolymerizable composition to decrease an amount of the photopolymerizable composition being discarded as waste material or reused while containing contaminant(s), leading to the production of lower quality three-dimensional objects.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE DRAWINGS

FIG. 1 is a flow chart of an exemplary method of the present disclosure.

DETAILED DESCRIPTION

Figure 2A:
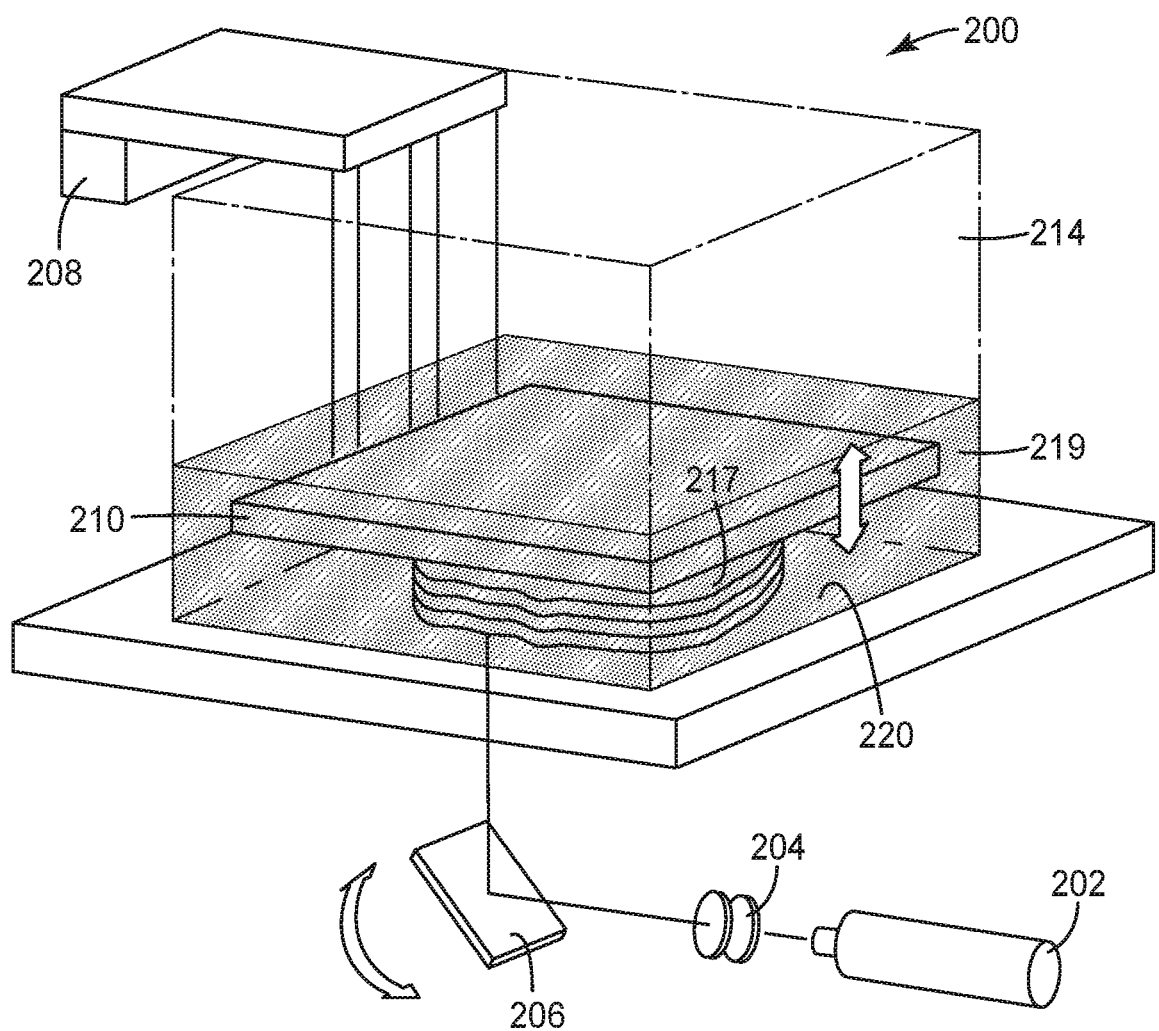
FIG. 2A is schematic perspective view of an additive manufacturing apparatus.

It has been discovered that contaminants can be removed from photopolymerizable compositions to enable the photopolymerizable composition to be reused. In at least certain embodiments, the cleaned photopolymerizable composition has sufficient cleanliness to be used in the same batch with a volume of unused (e.g., initial) photopolymerizable composition. Even compositions that have a viscous and/or pasty consistency may have contaminants successfully removed from them using methods or systems according to at least certain embodiments of the present disclosure.

For instance, depending on the particular geometry of a three-dimensional object (e.g., a printed part), unintended undercuts in the printing geometries can result in tiny parts of resin that are cured without sufficient adhesion to the rest of a printed part and pollute the remaining photopolymerizable composition, the tiny parts having a size of one or more voxels. Another issue can be that after repeated use, one or more surfaces of a vat exhibit increased adhesion forces during the printing and entire parts or portions of a support geometry can break off and pollute the vat. Further pollution can be, e.g., lint from the surrounding air, although such pollution can be minimized by using, e.g., a laminar flow system for applying clean room conditions. During the printing of multiple parts within one vat, however, contaminants of tiny broken parts, lint, etc., are impractical to completely prevent.

Glossary

As used herein, "actinic radiation" encompasses UV radiation, e-beam radiation, visible radiation, infrared radiation, gamma radiation, and any combination thereof.

As used herein, a "monomer" is a single, one unit molecule capable of combination with itself or other monomers to form oligomers or polymers; an "oligomer" is a component having 2 to 9 repeat units; and a "polymer" is a component having 10 or more repeat units.

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from two to twelve carbon atoms, e.g., methylene, ethylene, propylene, 2-methylpropylene, pentylene, hexylene, and the like.

As used herein, "alkenyl" refers to a monovalent linear or branched unsaturated aliphatic group with one or more carbon-carbon double bonds, e.g., vinyl. Unless otherwise indicated, the alkenyl groups typically contain from two to twenty carbon atoms.

As used herein, "alkenediyl" refers to a straight-chained, branched, or cyclic divalent unsaturated aliphatic group, e.g., —CH=CH—, —CH=C(CH$_3$)CH$_2$—, —CH=CHCH$_2$—, and the like. Unless otherwise indicated, the alkenediyl groups typically contain from two to twenty carbon atoms.

As used herein, the term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

As used herein, the term "substituted aryl" refers to an aryl group substituted with at least one alkyl group, substituted with at least one alkoxy group, or substituted with at least one alkyl group plus at least one alkoxy group. The substituted aryl group contains 6 to 40 carbon atoms. The substituted aryl group often contains an aryl group having 5 to 20 carbon atoms and an alkyl group and/or alkoxy group each having 1 to 20 carbon atoms.

As used herein, the term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

As used herein, the term "ethylenically unsaturated" refers to a double bond between two carbon atoms, and includes functional groups such as vinyl (H$_2$C=CH—), including vinyl ethers (H$_2$C=CHO), vinyl esters (H$_2$C=CHOCO), styrene (e.g., vinylbenzene) and alkenyl (H$_2$C=CH(CH$_2$)$_n$— wherein n typically ranges from 1 to 30 or 1 to 20 or 1 to 10). Ethylenically unsaturated groups also include (meth)acryl such as (meth)acrylamide (H$_2$C=CHCONH— and H$_2$C=CH(CH$_3$)CONH—) and (meth)acrylate (CH$_2$=CHCOO— and CH$_2$=C(CH$_3$)COO—).

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl group, and linked by an aliphatic segment if containing two or more groups. As used herein, "(meth)acrylate-functional compounds" are compounds that include, among other things, a (meth)acrylate moiety. The term "(meth)acryloyl" refers to a group of formula CH$_2$=CHR$^b$—(CO)— where R$^b$ is hydrogen or methyl and the group —(CO)— refers to a carbonyl group.

As used herein, "diameter" refers to the longest straight length across a shape (two-dimensional or three-dimensional) that intersects a center of the shape.

As used herein, "fluid" refers to emulsions, dispersions, suspensions, solutions, and pure components having a continuous liquid phase, and excludes powders and particulates in solid form.

As used herein, "liquid" refers to the state of matter that is not solid or gas, which has a definite volume and an indefinite shape.

As used herein, "curing" and "polymerizing" each mean the hardening or partial hardening of a composition by any mechanism, e.g., by heat, light, radiation, e-beam, microwave, chemical reaction, or combinations thereof.

As use herein, "cured" refers to a material or composition that has been hardened or partially hardened (e.g., polymerized or crosslinked) by one or more curing mechanisms.

As used herein, "photopolymerizable" refers to a composition containing at least one material that can be hardened or partially hardened using actinic radiation.

As used herein, "initial photopolymerizable composition" refers to a photopolymerizable composition that has not had any of its volume exposed to actinic radiation, which contains a full amount of each component of a formulation and lacks any contaminants formed during curing.

As used herein, "separated photopolymerizable composition" refers to a composition that contains at least one material that can be hardened or partially hardened using actinic radiation, containing less than a full amount of at least one component of a formulation. The separated photopolymerizable composition has had a portion of its volume exposed to actinic radiation. The separated photopolymerizable composition has also been subjected to a process to separate at least one contaminant from the photopolymerizable composition.

As used herein, "contaminant" refers to a material disposed in a photopolymerizable composition that was not deliberately included in the composition formulation. Contaminants may include at least one of an oligomer, a polymer, a dust particle, lint, a plurality of cured voxels formed from the photopolymerizable composition, or a part formed of a polymerized product of the photopolymerizable composition.

The term "mass inertial force" as referred to herein may be specified as force per unit mass and therefore may be specified in the unit m/s$^2$. Further, the mass inertial force can be expressed by the G-force which is a factor of the acceleration of gravity. For the purposes of the present specification the acceleration of gravity is 9.81 m/s$^2$. Consequently, for example a mass inertial force of 9.81 m/s$^2$ can be expressed as 1 G.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Methods

In a first aspect, a method is provided. The method comprises:
a) obtaining an insert comprising a sieve defining a plurality of openings each having a diameter of 10 to 200 micrometers;
b) placing a volume of a fluid in the insert, wherein the fluid comprises a photopolymerizable composition and a contaminant; and
c) subjecting the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition.

Referring to FIG. 1, a flow chart is provided of the method of the first aspect. More particularly, the method comprises Step 110 to a) obtain an insert comprising a sieve defining a plurality of openings each having a diameter of 10 to 200 micrometers; and Step 120 to b) place a volume of a fluid in the insert, wherein the fluid comprises a photopolymerizable composition and a contaminant.

Figure 2B:
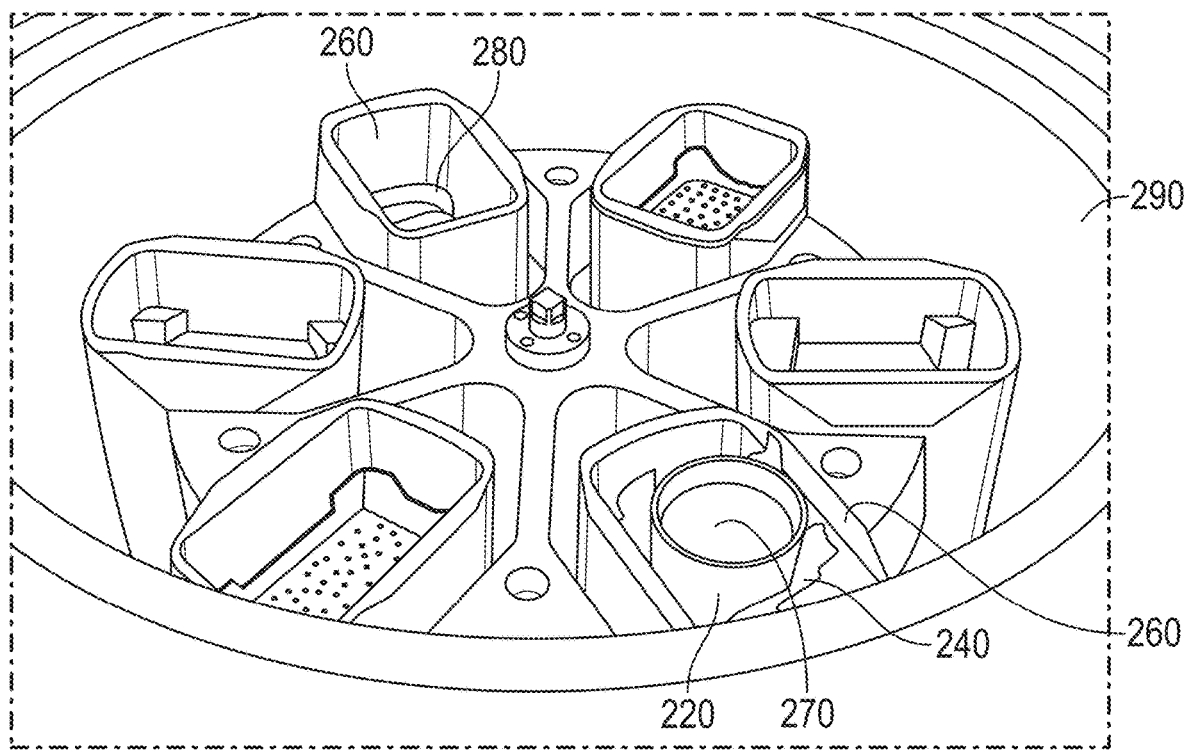
FIG. 2B is a schematic perspective view of a centrifuge.
Figure 3A:
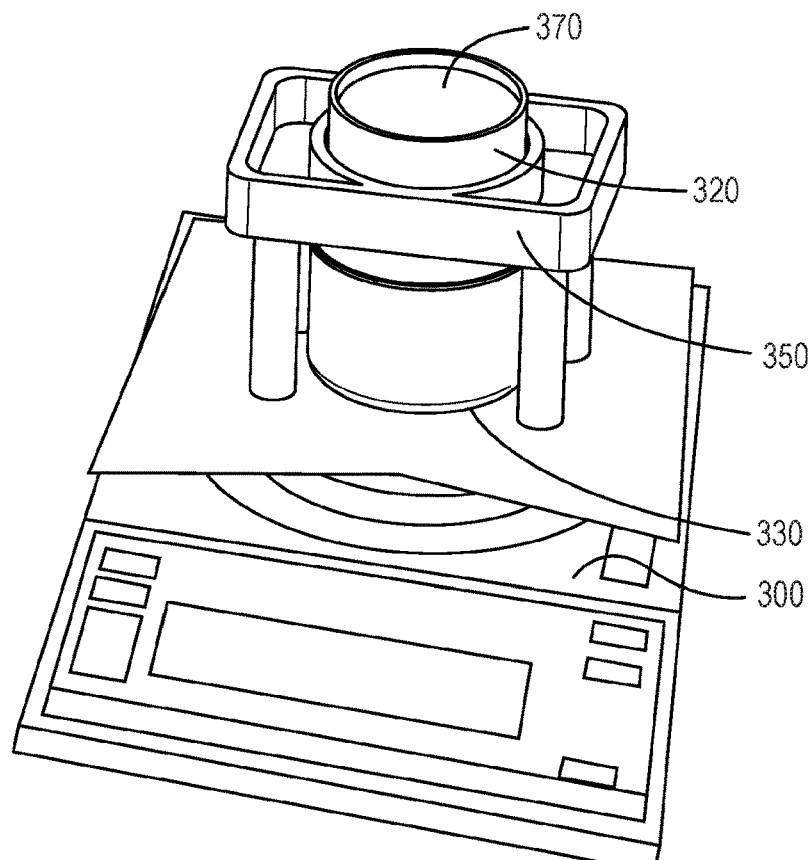
FIG. 3A is a schematic perspective view of an exemplary insert disposed partially in a container, with the insert holding a volume of fluid, according to the present disclosure.

In some embodiments, the insert is placed in a centrifuge before depositing the fluid in the insert. In some embodiments, the insert is placed in a centrifuge after depositing the fluid in the insert. The configuration of the insert may vary so long as the insert includes a sieve and defines an open area to hold a volume of the fluid. Referring to FIG. 3A, an exemplary insert 320 (coupled with each of a container 330 and a stand 350) is shown placed on a laboratory scale 300. Weighing an insert 320 after the fluid 370 has been added assists in achieving a suitable balance of mass during the application of centrifugal force when a weight or another insert containing fluid will be subjected to the centrifugal force at the same time as the insert 320. For instance, FIG. 2B shows an insert 220 that contains fluid 270 and is disposed in a cup 260 that is set in a centrifuge 290. A sieve 240 having a form of a nonwoven cloth is located partially within the insert 220, with the edges of the sieve 240 outside of the insert 220. In a location opposite the insert 220, another cup 260 contains an object 280 that provides a counterbalancing amount of mass within the centrifuge 290. In some embodiments, the method further comprises, prior to subjecting the volume of the fluid to a centrifugal force, placing a volume of the fluid in a second insert in the centrifuge in a location opposite the (e.g., first) insert to balance the centrifuge.

In some embodiments, the centrifuge comprises a sensor that measures imbalances and terminates centrifugal force if the imbalance is above a (e.g., predetermined) threshold amount. Monitoring the balance of the contents of the centrifuge during the application of centrifugal force could provide sensitive detection that two or more samples are exhibiting different flow rates of photopolymerizable composition through the sieves due to clogging of at least some of the sieve openings. Upon measuring such an imbalance, any sieves having an unacceptable extent of clogging can be cleaned or replaced prior to further application of centrifugal force. Other measurement methods could instead be employed to detect sieve clogging, such as measuring the fill levels of photopolymerizable composition in one or more inserts with ultrasonic or optical sensor(s).

The method further comprises Step 130 to c) subject the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition. The centrifugal force employed may be greater than 1 G, 1.5 G or greater, 2 G, 2.5 G, 3 G, 3.5 G, 4 G, 5 G, 6 G, 7 G, 8 G, 9 G, 10G, 11 G, 12G, 13G, 14G, 15 G, 16 G, 17 G, 18 G, 19 G, or 20 G or greater; and 100 G or less, 90 G, 85 G, 80 G, 75 G, 70 G, 65 G, 60 G, 55 G, 50 G, 45 G, or 40 G or less. One of skill in the art can determine suitable parameters based on the viscosity of a particular fluid, with more viscous fluid and/or fluid having a consistency of a paste, typically requiring higher centrifugal forces to urge the fluid through the sieve openings. In contrast, very low viscosity material could pass through a sieve with minimal centrifugal force and use of high centrifugal forces may risk breaking debris parts into smaller pieces during centrifugation, particularly if the parts are formed of a fragile material.

Advantageously, centrifugal force is typically applied to the fluid at ambient pressure. This is in contrast to methods of separating contaminants from photopolymerizable compositions that require use of the force of either negative pressure (e.g., vacuum) or positive pressure to drive the photopolymerizable composition through a filter to effectively separate contaminants from the photopolymerizable composition. Use of positive pressure or negative pressure would incorporate undesirable additional complexity to a method or system. In some embodiments, photopolymerizable compositions for which the methods described herein are useful exhibit shear thinning behavior. Such behavior assists in successfully separating contaminants from the photopolymerizable composition because the centrifugal force imparts shear to the photopolymerizable composition and the photopolymerizable composition thins out, reducing its viscosity and enhancing the passage of the photopolymerizable composition through the sieve and into the container. Methods disclosed herein are also suitable for fluids that exhibit Newtonian viscosity behavior. Moreover, certain methods already employ a centrifuge to remove uncured photopolymerizable composition from a three-dimensional object, thus contaminants can advantageously be removed from a fluid using the same centrifuge.

In some embodiments, the separated photopolymerizable composition further comprises a particulate filler. It will be understood that any particulate filler present in the fluid will be sufficiently small to pass through the openings of the sieve, thus have an effective diameter of less than 200 micrometers, 175, 150, 125, 100, 90, 80, 70, 60, 50, 40, 30, 20, 10, 8, 6, 4, 2, or less than 1 micrometer. In certain embodiments, the particulate filler comprises nanoparticles, in which at least one dimension of the particulate filler is smaller than 1 micrometer, such as 950 nanometers or less, 900, 850, 800, 750, 700, 650, 600, 550, 500, 450, 400, 350, or 300 nanometers or less; and 1 nanometer or larger, 2, 5, 7, 10, 12, 15, 18, 20, 25, 30, 35, 40, 45, 50, 55, 60, 65, 70, 75, 80, 85, 90, 95, 100, 125, 150, 175, 200, 225, 250, or 275 nanometers or larger. Some suitable particulate fillers include for instance and without limitation, oxides of yttrium, strontium, barium, zirconium, hafnium, niobium, tantalum, tungsten, bismuth, molybdenum, tin, zinc, lanthanide elements (i.e., elements having atomic numbers ranging from 57 to 71, inclusive), cerium and combinations thereof. Examples of non-agglomerated silicon dioxide (silica) nanoparticles commercially available from Nalco Chemical Co. (Naperville, IL) under the product designation NALCO COLLOIDAL SILICAS, e.g., NALCO products #1040, 1042, 1050, 1060, 2327 and 2329; and the silica nanoparticles described in U.S. Pat. No. 6,899,948 (Zhang et al.) and U.S. Pat. No. 6,572,693 (Wu et al.).

In some embodiments, at least a portion of the insert is disposed in a container configured to fit in a centrifuge and the portion of the photopolymerizable composition that passes through the sieve of the insert is collected in the container. Referring to FIGS. 2C and 2D, schematic diagrams are provided of an exemplary insert 220 partially disposed within a container 230. This insert 220 is positioned above a majority of the volume of the container 230 when in use to assist in passing the photopolymerizable composition from the insert 220 to the container 230 below with the assistance of centrifugal force and gravity. A sieve 240 is located within the insert 220. The sieve 240 may be integrally formed with the insert 220 or be a separate item configured to be placed inside the insert 220. The sieve 240 is typically positioned adjacent to or within the container 230.

In the embodiment shown in FIGS. 2C and 2D, the container 230 is partially supported by a stand 250, which comprises at least two feet 252 supporting a body 254. The body 254 of the stand 250 is configured to at least partially surround the insert 220. In certain embodiments, the stand 250 further comprises a ledge 256 configured to support the insert 220. Collectively, the insert 220, the container 230, the sieve 240, and the stand 250, may advantageously be (e.g., removably) disposed within a cup 260. In preferred embodiments, the stand 250 is configured to minimize motion of the insert 220 and the container 230 within the cup 260 during subjection to centrifugal force. Similarly, the cup 260 can be sized to fit in a particular apparatus (e.g., a centrifuge) that subjects a volume of fluid in the insert 220 to a centrifugal force.

Providing a stand is optional. In embodiments without a stand, for instance, the insert may have a size and shape that is complementary to the interior surfaces of a cup that fits in an apparatus that imparts centrifugal force (e.g., a centrifuge).

Figure 3B:
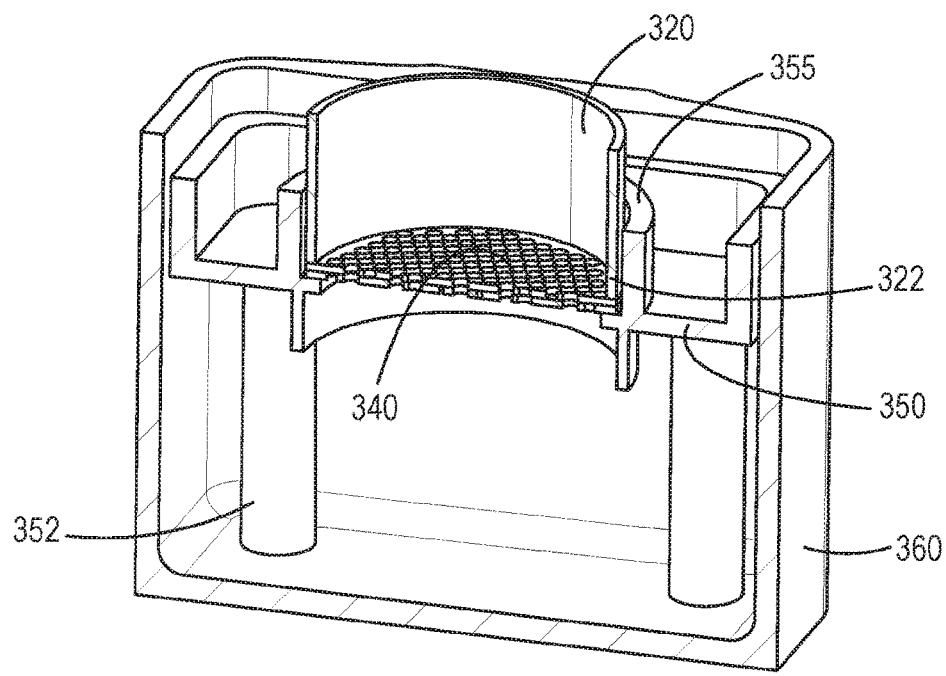
FIG. 3B is a schematic perspective view of an exemplary insert disposed partially in a container, according to the present disclosure.

FIG. 3B is a schematic perspective view of another exemplary insert disposed partially in a container. In this embodiment, the outer dimensions of the insert 320 are sized to fit in a cup 360 and the cup 360 also acts as the container to receive separated photopolymerizable composition that passes through a sieve 340 near the lower portion of a wall 322 of the insert 320. The embodiment illustrated in FIG. 3B is shown assembled ready for subjection to centrifugal force, for instance comprising the insert 320 supported by a stand 350, all disposed in a container/cup 360. The upper portion of the insert 320 is located above the top of the container/cup 360. The stand 350 of this embodiment includes an integral wall 355 that surrounds at least some of an exterior of the insert 320 and provides stability to the insert 320 within the container/cup 360. The stand 350 comprises a plurality of legs 352 that support the stand 350 in the container/cup 360 and will come into contact with separated photopolymerizable composition as it passes through the sieve 340 into the container/cup 360. Other configurations that provide an insert partially disposed within a container may be used.

Figure 4:
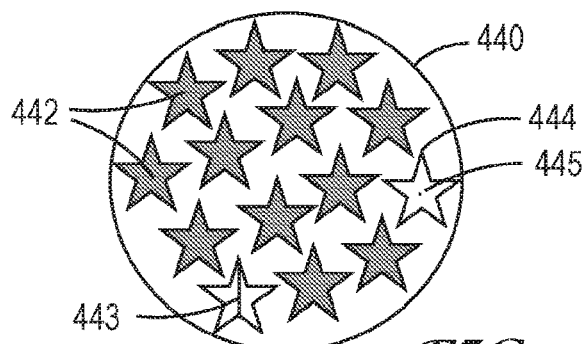
FIG. 4 is a schematic top view of an exemplary sieve having a plurality of openings having a star shape, according to the present disclosure.

Referring to FIG. 4, a schematic top view is provided of an exemplary sieve 440 having a plurality of openings 442, each having a star shape. The shape of the openings of the sieve is not particularly limited, and in some embodiments comprises one or more of a circular shape, an oval shape, a quadrilateral shape, a triangular shape, or a star shape. In some embodiments, a suitable sieve is a woven material comprising quadrilateral (e.g., square or rectangle) openings. As mentioned above, sieves according to the present disclosure define a plurality of openings each having a diameter of 10 to 200 micrometers. In some embodiments, the openings each have a diameter of 10 micrometers or greater, 15, 20, 25, 30, 35, 40, 45, 50, 55, 60, 65, 70, or 75 micrometers or greater, and 200 micrometers or less, 190, 180, 170, 160, 150, 140, 130, 120, 110, 100, 95, 90, 85, or 80 micrometers or less. The opening size may be selected based on the smallest openings that will allow particulate filler to pass through without the openings becoming clogged prior to completing a separation of photopolymerizable composition from a contaminant.

FIG. 4 shows a line 443 indicating where the diameter of one star opening 442 is measured. In this case, the star opening 442 has points of equal size, so the diameter 443 can be determined by measuring the length of a straight line starting from any one of the points, through the center of the star, and to an opposing edge of the star opening 442. Locations of one point 444 and the center 445 are indicated on another star opening 442 (for clarity). If the points of the star were not all the same, the diameter 443 would be determined by starting the measurement from the point located furthest away from the center of the star opening 442.

Figure 5:
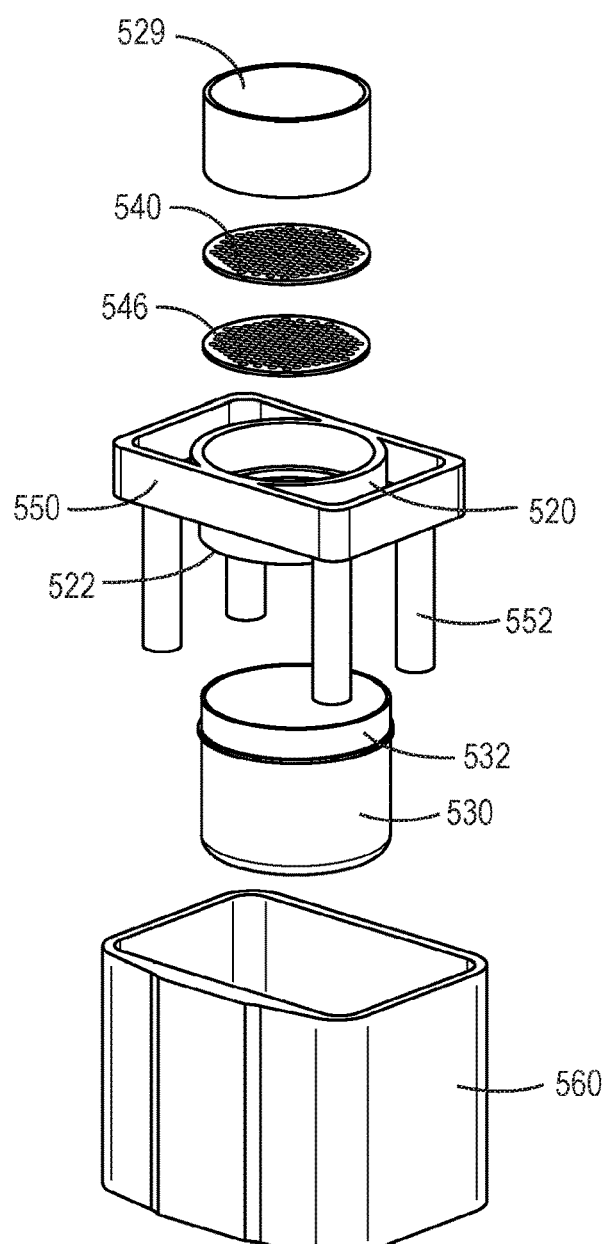
FIG. 5 is a schematic perspective exploded view of an exemplary insert having two sieves, according to the present disclosure.

Referring to FIG. 5, a schematic perspective exploded view is provided of another exemplary insert 520 disposed partially in a container 530. In this embodiment, the insert 520 is integrally formed with a stand 550 and the stand is sized to fit within a cup 560. For example, a lower portion of a wall 522 of the insert may be configured to nest within an upper portion of a wall 532 of the container 530. Other configurations that provide an insert partially disposed within a container may be used. The upper portion of the insert 520 will be located above the top of the cup 560 when the components are assembled. The stand 550 of this embodiment includes a plurality (e.g., four) of legs 552 to support the insert 520 within the cup 560. In this embodiment, the sieve 540 is a first sieve and the insert 520 further comprises a second sieve 546 disposed adjacent to the first sieve 540, wherein the second sieve 546 defines a plurality of openings that each have a diameter that is smaller than the plurality of openings of the first sieve 540. Use of a first sieve having larger openings can retain larger contaminants (with less clogging than if just the second sieve was used), while the second sieve can retain smaller contaminants than the first sieve. The embodiment illustrated in FIG. 5 further includes a removable sieve stabilizer 529 that, when in place in an upper portion of the insert 520, tends to hold the one or more sieves 540, 546 in place, particularly when a sieve (e.g., 546) comprises a nonwoven cloth. In this embodiment, the removable sieve stabilizer 529 has a shape of a cylinder, but other shapes may also be useful. Collectively, the removable sieve stabilizer 529, the integral insert 520 and stand 550, the sieves 540 and 546, the container 530, may advantageously be (e.g., removably) disposed within the cup 560.

Figure 6:
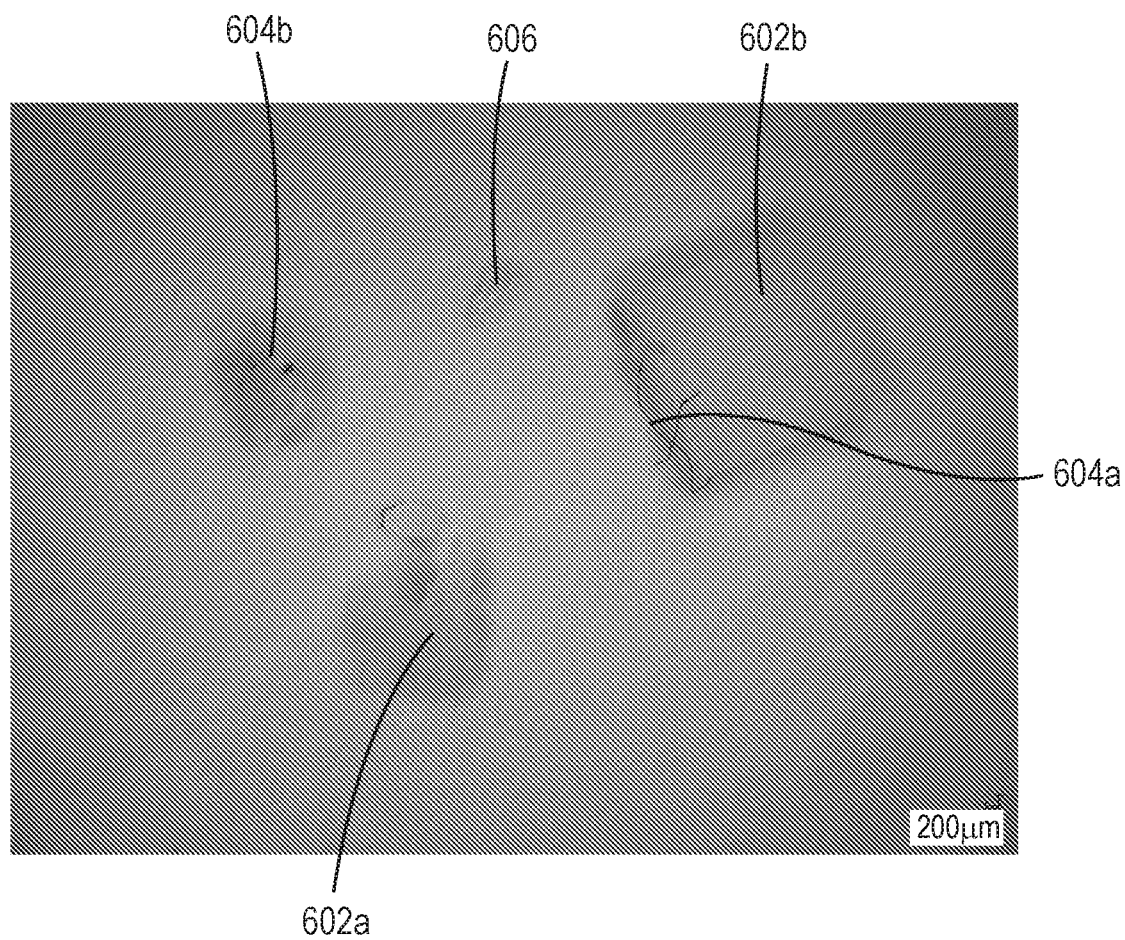
FIG. 6 is a photograph of contaminants recovered from a photopolymerizable composition.

Examples of typical contaminant materials that may be present in a photopolymerizable composition include for instance and without limitation, one or more of an oligomer, a polymer, a dust particle, lint, a part formed of a polymerized product of the photopolymerizable composition, or a plurality of cured voxels formed from the photopolymerizable composition (e.g., very small parts). FIG. 6 is a photograph of contaminants that were recovered from a photopolymerizable composition, including parts 602a, 602b formed of a polymerized product of the photopolymerizable composition, lint 604a, 604b, and a plurality of cured voxels 606. The part 602a has an irregular shape and was likely broken off of a larger part. The part 602b has a rectangular prismatic shape. As used herein, the term "lint" encompasses fine fibers that may be present individually, with one or more other fine fibers, or as an accumulation of many fine fibers. Dust may also be present in or on the lint. In FIG. 6, two strands of lint 604a are visible disposed on the part 602b, as well as a separate cluster of lint 604b. The plurality of cured voxels 606 have a length of about 200 micrometers.

Optionally, methods according to the present disclosure further comprise a step of d) subjecting the separated photopolymerizable composition to homogenization. Homogenization can be useful to ensure any particulate filler present is generally evenly suspended throughout the separated photopolymerizable composition. Homogenization can be performed using a kneader, a hand mixer, a speed mixer, a sonicator, a mill, or the like. In select embodiments, a kneader or mixer is preferred for homogenization. The homogenization may be performed under vacuum. Advantageously, when employing a kneader, it is possible to apply a vacuum to remove dissolved gas and air bubbles from the photopolymerizable composition during the homogenization. In some embodiments, a container for receiving separated photopolymerizable composition can be selected that is compatible with the homogenization apparatus so the separated photopolymerizable composition does not need to be transferred to a different container for homogenization. It is noted that the centrifugal force applied to the fluid also tends to remove some air bubbles from the photopolymerizable composition as it is separated from the contaminant. Similarly, in some embodiments, methods according to the present disclosure further comprise a step of e) subjecting the separated photopolymerizable composition to additional centrifugation to remove at least a portion of a dissolved gas or gas bubbles from the photopolymerizable composition.

In some embodiments, methods according to the present disclosure further comprise, prior to step a), f) selectively curing an initial photopolymerizable composition using actinic radiation to provide a three-dimensional object and the fluid comprising the photopolymerizable composition and the contaminant. As mentioned above, the initial photopolymerizable composition has not yet been subjected to actinic radiation. Selective curing processes (e.g., additive manufacturing) to form a three-dimensional object also generate the one or more contaminants in a fluid. Suitable photopolymerizable compositions to be selectively cured are not particularly limited. One composition that may be useful in methods according to the present disclosure is as described in co-owned International Application Publication No. WO 2018/231583 (Hermann et al.). For instance, such a photopolymerizable composition may comprise:

a resin matrix comprising:
polymerizable (meth)acrylate(s) not comprising a urethane moiety,
polymerizable urethane(meth)acrylate(s),
wherein the polymerizable (meth)acrylate(s) not comprising a urethane moiety are used in
excess over the polymerizable urethane(meth)acrylate(s),
a filler matrix comprising:
nanocluster(s),
optionally fumed silica, preferably in an amount below 8 wt. %,
the filler matrix being present preferably in an amount of 5 to 45 wt. %,
an initiator system comprising:
photoinitiator(s),
organic dye(s),
the curable composition not comprising softener in an amount of more than 5 wt. %
with respect to the weight of the whole composition,
the curable composition having a viscosity below 150 Pa*s at 23° C. and a shear rate of 1 s$^{-1}$.

Further details regarding such photopolymerizable (e.g., curable) compositions are as described in WO 2018/231583 (Hermann et al.).

The selective curing (of an initial or separated) photopolymerizable composition may advantageously be performed via additive manufacturing, such as using stereolithography (e.g., vat polymerization). Suitable additive manufacturing methods are discussed below in more detail with respect to the second aspect (i.e., the system).

In some embodiments, methods according to the present disclosure further comprise a step of g) moving the three-dimensional object and thereby generating a mass inertial force in uncured photopolymerizable composition disposed on the three-dimensional object, thereby forming a coating layer of uncured photopolymerizable composition on the three-dimensional object, wherein the mass inertial force is generated using a centrifuge, a shaker, or a mixer that spins along one or more axes. In some embodiments, a coating layer of uncured photopolymerizable composition (following the application of mass inertial force) on the three-dimensional object has a thickness of 20 micrometers or greater, 25, 30, 35, 40, 45, or 50 micrometers or greater, and 200 micrometers or less. In other embodiments, as much uncured photopolymerizable composition as possible is removed from at least one surface of the three-dimensional object using the mass inertial force (e.g., thereby cleaning uncured photopolymerizable composition from the three-dimensional object). Suitable ways of generating a mass inertial force are described, for instance, in co-owned International Application Publication Nos. WO 2019/102304 (Kirchner et al.) and WO 2020/157598 (Chakraborty et al.), incorporated herein by reference in their entireties. For instance, the mass inertial force may be generated using a centrifuge, a shaker, or a mixer that spins along one or more axes. In some embodiments, the moving of the object is a rotation or spinning of the object. Accordingly, the mass inertial force may be a centrifugal force. One suitable mixer that spins along more than one axis is a dual asymmetric centrifugal mixer, such as the DAC 400 FVZ available from Flacktek, Landrum, SC. A dual asymmetric centrifugal mixer provides simultaneous dual axis spinning that automatically reorients the object during spinning, which tends to pull uncured composition out of concave features of the three-dimensional object in a short period of time (e.g., 20, 15, or 10 seconds or less).

In select embodiments, the mass inertial force may advantageously be applied to the three-dimensional object within the same insert as the subjection to centrifugal force in step c) of methods according to the present disclosure. Further optionally, the same centrifugal force may be used to both separate a contaminant from the photopolymerizable composition and to remove uncured photopolymerizable composition from the three-dimensional object, e.g., generally simultaneously. In some embodiments, uncured photopolymerizable composition can be collected, for example, in an automatic platform changer with vats that collect dripping uncured photopolymerizable composition upon removal of a three-dimensional object from the bulk of the uncured photopolymerizable composition, as well as in a container during application of mass inertial force (e.g., spin cleaning). Additional cleaning may also be performed to remove uncured photopolymerizable composition from one or more exterior or interior surface of the three-dimensional object, e.g., using any of a solvent (e.g., water, alcohol, and/or blends), compressed gas, or both.

When collection of fluid after manufacture of a three-dimensional object is performed in a clean room atmosphere, further contamination of the collection sources may advantageously be avoided. Furthermore, in case the bulk of the uncured photopolymerizable composition (e.g., remaining in an additive manufacturing vat) contains part fragments, optionally the whole remaining contents of the vat may be subjected to centrifugal force to separate at least the part fragments from the photopolymerizable composition to enable continuing production of three-dimensional objects from the photopolymerizable composition. Some scenarios in which bulk recycling of a photopolymerizable composition would be useful include, for instance, when a print job fails and broken parts are present in the photopolymerizable composition, or following (e.g., continuous) printing of many parts.

Post-processing of the formed three-dimensional object is optionally performed, for instance including post-curing, cleaning, or both. In some embodiments, the three-dimensional object comprises unreacted photopolymerizable components and the method further comprises h) subjecting the three-dimensional object to at least one of actinic radiation or heat to cure the unreacted photopolymerizable components. Exposure to actinic radiation can be accomplished with any convenient radiation source, generally UV radiation, visible radiation, and/or e-beam radiation, for a time ranging from about 1 to over 60 minutes. Heating is generally carried out at a temperature in the range of about 50-250° C., for a time ranging from about 10 to over 60 minutes in an inert atmosphere. So-called post-cure ovens, which combine UV radiation and thermal energy, are particularly well suited for use in post-cure processes. In general, post-curing improves the mechanical properties and stability of the three-dimensional object relative to the same three-dimensional object that is not post-cured.

In some embodiments, methods according to the present disclosure further comprise a step of i) analyzing the separated photopolymerizable composition for at least one of homogeneity or photoinitiator content. In some embodiments, homogeneity is analyzed by at least one of measuring a density, measuring a color, or measuring a filler content of multiple samples of the separated photopolymerizable composition. In some embodiments, homogeneity is analyzed by preparing three-dimensional objects from multiple samples of the separated photopolymerizable composition followed by testing of mechanical properties (e.g., tensile strength) and measuring the physical dimensions. Typically, test bars having a shape (e.g., dogbone) according to mechanical property standard test methods are formed, either by additive manufacturing samples of the separated photopolymerizable composition or by using a mold and casting samples of the separated photopolymerizable composition. Testing mechanical properties can indicate if photoinitiator concentration has decreased from the initial photopolymerizable composition or lack of homogeneity. If the physical dimensions of the objects are smaller or larger than designed, the separated photopolymerizable composition likely undercured or overcured, respectively, and does not meet homogeneity requirements. Typically, to be suitable for additive manufacturing, a photopolymerizable composition must be stable against significant separation of its components, at least on a time scale required to complete a print job. Optionally, a photopolymerizable composition can be extracted with a solvent to measure its particulate filler content, and preferably testing several sections of the photopolymerizable composition to determine if the particulate filler content is the generally the same throughout, to indicate homogeneity of the photopolymerizable composition. Suitable methods for analyzing the photoinitiator content include each of Infrared (IR) spectroscopy and high-pressure liquid chromatography (HPLC).

In some embodiments, methods according to the present disclosure further comprise a step of j) placing at least a portion of the separated photopolymerizable composition into an additive manufacturing apparatus; and k) selectively curing the separated photopolymerizable composition in the additive manufacturing apparatus using actinic radiation to form a three-dimensional object. Additionally, in some embodiments, methods according to the present disclosure further comprise, prior to step j) or step k), a step of l) blending at least a portion of the separated photopolymerizable composition with a volume of an initial photopolymerizable composition. In at least certain embodiments, the separated photopolymerizable composition has sufficient cleanliness to be used by itself in place of, or in the same batch with, an unused (e.g., initial) photopolymerizable composition. Advantageously, such processes may be used in a medical product process by enabling recycling within one batch and reusing the recycled photopolymerizable composition without actual material batch mixing. Also, as a matter of practicality, a photopolymerizable composition may have only come into direct contact with a few simple shaped manufactured parts, rendering the photopolymerizable composition readily recyclable by separation from the parts and any contaminants.

In some embodiments, methods according to the present disclosure further comprise a step of m) at least one of cleaning the sieve or replacing the sieve once the plurality of openings of the sieve are clogged by the contaminant. After at least one use, the sieve tends to become clogged by one or more contaminants, requiring washing or exchange for a clean sieve. Moreover, it may be useful to change to a sieve having a different opening sizes. In select embodiments, when a sieve is composed of nylon, isopropanol is a suitable cleaning solvent for the sieve. Optionally, disposable sieves may be employed that are discarded following use.

Systems

In a second aspect, a system is provided. The system comprises:
a) an additive manufacturing apparatus;
b) a centrifuge; and
c) an insert configured to be inserted in the centrifuge, the insert comprising a sieve defining a plurality of openings each having a diameter of 10 to 200 micrometers.

Methods of printing a three-dimensional object described herein can include forming the article from a plurality of layers of a photopolymerizable composition described herein in a layer-by-layer manner. Further, the layers of a build material composition can be deposited according to an image of the three-dimensional object in a computer readable format. In some or all embodiments, the photopolymerizable composition is deposited according to preselected computer aided design (CAD) parameters (e.g., a data file).

Additionally, it is to be understood that methods of manufacturing a three-dimensional object described herein can include so-called "stereolithography/vat polymerization" 3D printing methods. Other techniques for three-dimensional manufacturing are known and may be suitably adapted to use in the applications described herein. More generally, three-dimensional fabrication techniques continue to become available. All such techniques may be adapted to use with photopolymerizable compositions described herein, provided they offer compatible fabrication viscosities and resolutions for the specified article properties. Fabrication may be performed using any of the fabrication technologies described herein, either alone or in various combinations, using data representing a three-dimensional object, which may be reformatted or otherwise adapted as necessary for a particular printing or other fabrication technology.

It is entirely possible to form a three-dimensional object from a photopolymerizable composition described herein using vat polymerization (e.g., stereolithography). For example, in some cases, a method of printing a three-dimensional object comprises retaining a photopolymerizable composition described herein in a fluid state in a container and selectively applying energy to the photopolymerizable composition in the container to solidify at least a portion of a fluid layer of the photopolymerizable composition, thereby forming a hardened layer that defines a cross-section of the three-dimensional object. Additionally, a method described herein can further comprise raising or lowering the hardened layer of photopolymerizable composition to provide a new or second fluid layer of unhardened photopolymerizable composition at the surface of the fluid in the container, followed by again selectively applying energy to the photopolymerizable composition in the container to solidify at least a portion of the new or second fluid layer of the photopolymerizable composition to form a second solidified layer that defines a second cross-section of the three-dimensional object. Further, the first and second cross-sections of the three-dimensional object can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can comprise applying actinic radiation, such as UV radiation, visible radiation, or e-beam radiation, having a sufficient energy to cure the photopolymerizable composition. A method can also comprise planarizing a new layer of fluid photopolymerizable composition provided by raising or lowering an elevator platform. Such planarization can be carried out, in some cases, by utilizing a wiper or roller or a recoater. Planarization corrects the thickness of one or more layers prior to curing the material by evening the dispensed material to remove excess material and create a uniformly smooth exposed or flat up-facing surface on the support platform of the printer.

It is further to be understood that the foregoing process can be repeated a selected number of times to provide the three-dimensional object. For example, in some cases, this process can be repeated "n" number of times. Further, it is to be understood that one or more steps of a method described herein, such as a step of selectively applying energy to a layer of photopolymerizable composition, can be carried out according to an image of the three-dimensional object in a computer-readable format. Suitable stereolithography printers include the Viper Pro SLA, available from 3D Systems, Rock Hill, SC and the Asiga PICO PLUS 39, available from Asiga USA, Anaheim Hills, CA.

Referring to FIGS. 2A-2D, an exemplary system is collectively illustrated, comprising an additive manufacturing apparatus (FIG. 2A), a centrifuge (FIG. 2B), and an insert (FIGS. 2C-2D) configured to be inserted into the centrifuge, the insert comprising a sieve defining a plurality of openings each having a diameter of 10 to 200 micrometers. FIGS. 2B, 2C, and 2D are described above in detail. The additive manufacturing apparatus, centrifuge, and insert of the system may be used in combination, for instance, as discussed above with respect to the first aspect.

Figure 2C:
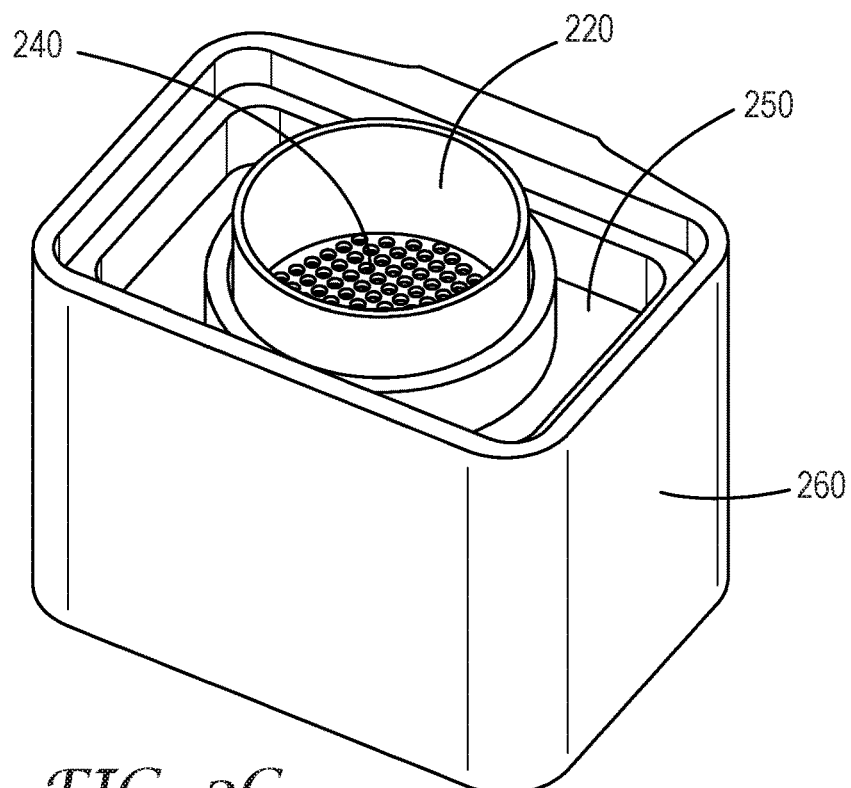
FIG. 2C is a schematic perspective view of an exemplary insert disposed partially in a container, according to the present disclosure.
Figure 2D:
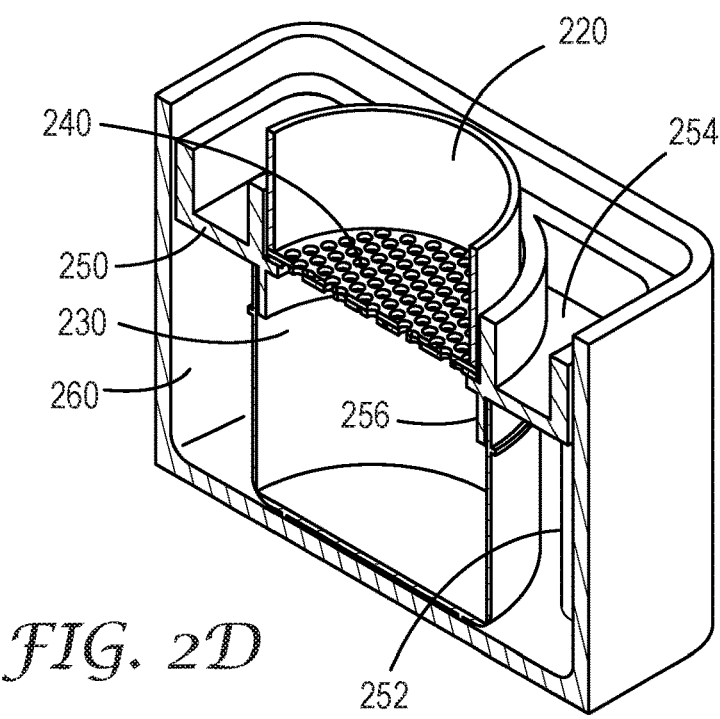
FIG. 2D is a schematic perspective cross-sectional view of the insert and container of FIG. 2C.

FIG. 2A shows a stereolithography apparatus ("SLA") that may be used in the system, for instance with the photopolymerizable compositions and methods described herein. In general, the apparatus 200 may include a laser 202, optics 204, a steering mirror or lens 206, an elevator 208, and a platform 210, within a vat 214 filled with the photopolymerizable composition 219. In operation, the laser 202 is steered through a wall 220 (e.g., the floor) of the vat 214 and into the photocurable composition to cure a cross-section of the photocurable composition 219 to form an article 217, after which the elevator 208 slightly raises the platform 210 and another cross section is cured. Suitable stereolithography printers include the NextDent 5100 and the FIG. 4, both available from 3D Systems, Rock Hill, SC, and the Asiga PICO PLUS 39, available from Asiga USA, Anaheim Hills, CA.

In some embodiments, vat polymerization with Digital Light Processing ("DLP"), employs a container of curable polymer (e.g., photopolymerizable composition). In a DLP based system, a two-dimensional cross section is projected onto the curable material to cure the desired section of an entire plane transverse to the projected beam at one time. One suitable apparatus for use with photopolymerizable compositions is the Rapid Shape D40 II DLP 3D printer (Rapid Shape GmbH, Heimsheim, Germany). All such curable polymer systems as may be adapted to use with the photopolymerizable compositions described herein are intended to fall within the scope of "vat polymerization" or "stereolithography" systems as used herein. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.).

The insert, container, and one or more sieves are all as described in detail above with respect to the first aspect.

Various embodiments are provided that include methods and systems for removing contaminants from photopolymerizable compositions.

In a first embodiment, the present disclosure provides a method. The method comprises: a) obtaining an insert comprising a sieve defining a plurality of openings each having a diameter of 10 to 200 micrometers; b) placing a volume of a fluid comprising a photopolymerizable composition and a contaminant in the insert; and c) subjecting the volume of the fluid to a centrifugal force to separate the contaminant from at least a portion of the photopolymerizable composition by retaining the contaminant in the insert and passing at least a portion the photopolymerizable composition through the sieve of the insert to provide a separated photopolymerizable composition.

In a second embodiment, the present disclosure provides a method according to the first embodiment, further comprising placing the insert in a centrifuge either before or after placing the volume of fluid in the insert.

In a third embodiment, the present disclosure provides a method according to the first embodiment, wherein at least a portion of the insert is disposed in a container configured to fit in the centrifuge and the portion of the photopolymerizable composition that passes through the sieve of the insert is collected in the container.

In a fourth embodiment, the present disclosure provides a method according to the third embodiment, further comprising, prior to step c), placing a volume of the fluid in a second insert in the centrifuge in a location opposite the insert of step b) to balance the centrifuge.

In a fifth embodiment, the present disclosure provides a method according to any of the first through third embodiments, wherein the contaminant comprises at least one of an oligomer, a polymer, a dust particle, lint, a plurality of cured voxels formed from the photopolymerizable composition, or a part formed of a polymerized product of the photopolymerizable composition.

In a sixth embodiment, the present disclosure provides a method according to any of the first through fifth embodiments, wherein the photopolymerizable composition exhibits shear thinning behavior.

In a seventh embodiment, the present disclosure provides a method according to any of the first through sixth embodiments, wherein the separated photopolymerizable composition further comprises a particulate filler.

In an eighth embodiment, the present disclosure provides a method according to the seventh embodiment, further comprising d) subjecting the separated photopolymerizable composition to homogenization.

In a ninth embodiment, the present disclosure provides a method according to the eighth embodiment, wherein the homogenization is performed under vacuum.

In a tenth embodiment, the present disclosure provides a method according to any of the first through ninth embodiments, comprising subjecting the separated photopolymerizable composition to homogenization using a kneader or mixer.

In an eleventh embodiment, the present disclosure provides a method according to any of the first through tenth embodiments, wherein step c) is performed at ambient pressure.

In a twelfth embodiment, the present disclosure provides a method according to any of the first through eleventh embodiments, wherein the plurality of openings of the sieve comprise a circular shape, an oval shape, a quadrilateral shape, a triangular shape, or a star shape.

In a thirteenth embodiment, the present disclosure provides a method according to any of the first through twelfth embodiments, wherein the plurality of openings of the sieve each have a diameter of 20 micrometers or more, 30 micrometers or more, 40 micrometers or more, 50 micrometers or more, or 60 micrometers or more; and a diameter of 100 micrometers or less, 90 micrometers or less, or 80 micrometers or less.

In a fourteenth embodiment, the present disclosure provides a method according to any of the first through thirteenth embodiments, wherein the sieve is a first sieve and the insert further comprises a second sieve disposed adjacent to the first sieve, wherein the second sieve defines a plurality of openings each having a diameter that is smaller than the plurality of openings of the first sieve.

In a fifteenth embodiment, the present disclosure provides a method according to any of the first through fourteenth embodiments, wherein in step c) the fluid is subjected to a centrifugal force of greater than 1 G.

In a sixteenth embodiment, the present disclosure provides a method according to any of the first through fifteenth embodiments, further comprising e) subjecting the separated photopolymerizable composition to additional centrifugation to remove at least a portion of a dissolved gas or gas bubbles from the photopolymerizable composition.

In a seventeenth embodiment, the present disclosure provides a method according to any of the first through sixteenth embodiments, further comprising, prior to step a), f) selectively curing an initial photopolymerizable composition using actinic radiation to provide a three-dimensional object and the fluid comprising the photopolymerizable composition and the contaminant.

In an eighteenth embodiment, the present disclosure provides a method according to the seventeenth embodiment, further comprising g) moving the three-dimensional object and thereby generating a mass inertial force in a portion of the fluid that is disposed on the three-dimensional object, wherein the mass inertial force is generated using a centrifuge, a shaker, or a mixer that spins along one or more axes.

In a nineteenth embodiment, the present disclosure provides a method according to the eighteenth embodiment, wherein the generating the mass inertial force forms a coating layer of uncured photopolymerizable composition on the three-dimensional object, the coating layer having a thickness of 20 micrometers or greater, 30 micrometers or greater, 40 micrometers or greater, or 50 micrometers or greater.

In a twentieth embodiment, the present disclosure provides a method according to any of the seventeenth through nineteenth embodiments, wherein the three-dimensional object comprises unreacted photopolymerizable components and wherein the method further comprises h) subjecting the three-dimensional object to at least one of actinic radiation or heat to cure the unreacted photopolymerizable components.

In a twenty-first embodiment, the present disclosure provides a method according to any of the first through twentieth embodiments, further comprising i) analyzing the separated photopolymerizable composition for at least one of homogeneity or photoinitiator content.

In a twenty-second embodiment, the present disclosure provides a method according to the twenty-first embodiment, wherein homogeneity is analyzed by at least one of measuring a density, measuring a color, measuring a mechanical property and/or physical dimensions of a three-dimensional object formed from the separated photopolymerizable composition, or measuring a filler content of multiple samples of the separated photopolymerizable composition.

In a twenty-third embodiment, the present disclosure provides a method according to the twenty-first embodiment or twenty-second embodiment, wherein the photoinitiator content is analyzed by at least one of Infrared (IR) spectroscopy or high-pressure liquid chromatography (HPLC).

In a twenty-fourth embodiment, the present disclosure provides a method according to any of the first through twenty-third embodiments, further comprising j) placing at least a portion of the separated photopolymerizable composition into an additive manufacturing apparatus; and k) selectively curing the separated photopolymerizable composition in the additive manufacturing apparatus using actinic radiation to form a three-dimensional object.

In a twenty-fifth embodiment, the present disclosure provides a method according to the twenty-fourth embodiment, further comprising, prior to step j) or step k), l) blending at least a portion of the separated photopolymerizable composition with a volume of an initial photopolymerizable composition.

In a twenty-sixth embodiment, the present disclosure provides a method according to any of the first through twenty-fifth embodiments, further comprising m) at least one of cleaning the sieve or replacing the sieve once the plurality of openings of the sieve are clogged by the contaminant.

In a twenty-seventh embodiment, the present disclosure provides a system. The system comprises: a) an additive manufacturing apparatus; b) a centrifuge; and c) an insert configured to be inserted in the centrifuge. The insert comprises a sieve defining a plurality of openings each having a diameter of 10 to 200 micrometers.

In a twenty-eighth embodiment, the present disclosure provides a system according to the twenty-seventh embodiment, further comprising a container configured to be inserted in the centrifuge, wherein at least a portion of the insert is sized to fit in the container.

In a twenty-ninth embodiment, the present disclosure provides a system according to the twenty-eighth embodiment, wherein the container has a volume that is greater than a volume of at least the portion of the insert that is sized to fit in the container.

In a thirtieth embodiment, the present disclosure provides a system according to any of the twenty-seventh through twenty-ninth embodiments, wherein the plurality of openings of the sieve comprise a circular shape, an oval shape, a quadrilateral shape, a triangular shape, or a star shape.

In a thirty-first embodiment, the present disclosure provides a system according to any of the twenty-seventh through thirtieth embodiments, wherein the plurality of openings of the sieve each have a diameter of 20 micrometers or more, 30 micrometers or more, 40 micrometers or more, 50 micrometers or more, or 60 micrometers or more; and a diameter of 100 micrometers or less, 90 micrometers or less, or 80 micrometers or less.

In a thirty-second embodiment, the present disclosure provides a system according to any of the twenty-seventh through thirty-first embodiments, wherein the sieve is a first sieve and the insert further comprises a second sieve disposed adjacent to the first sieve, wherein the second sieve defines a plurality of openings each having a diameter that is smaller than the plurality of openings of the first sieve.

In a thirty-third embodiment, the present disclosure provides a system according to any of the twenty-seventh through thirty-second embodiments, further comprising a removable sieve stabilizer.

In a thirty-fourth embodiment, the present disclosure provides a system according to any of the twenty-seventh through thirty-third embodiments, wherein the centrifuge comprises a sensor that measures imbalances and terminates centrifugal force if the imbalance is above a threshold amount.

The following Examples are set forth to describe additional features and embodiments of the invention. All parts are by weight unless otherwise indicated.

Examples

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise noted or readily apparent from the context, all parts, percentages, ratios, etc. in the Examples and the rest of the specification are by weight.

TABLE 1

| Materials | | |
|---|---|---|
| Zr/Si Nanocluster | Aggregated nanoparticles; nanoclusters; filler | U.S. Pat. No. 6,730,156 B1, column 25, Preparatory Example A; the obtained filler particles were surface treated according to Preparatory Example B of U.S. Pat. No. 6,730,156 B1. |
| HDK H-2000 | Fumed silica filler; surface modification: —OSi(CH$_3$)$_3$; agglomerated nanoparticles | Wacker Chemie AG, Munich, Germany |
| SG-YBF100 | Ytterbium fluoride powder; filler | Sukgyung AT. Co. Ltda, Ansa City, Korea |
| D-Zethacrylate | Ethoxylated Bisphenol A dimethacrylate; polymerizable methacrylate | Sigma-Aldrich, St. Louis, MO |
| DESMA | Urethane(meth)acrylate; polymerizable methacrylate | Example 1 of EP 2 167 013 B1 (page 20) |
| IONOL | 2,6-ditert.butyl-4-methylphenol; stabilizer, available under the trade designation IONOL | Oxiris Chemicals, Barcelona, Spain |
| LUCIRIN TPO | Photoinitiator | BASF, Ludwigshafen, Germany |
| LUMILUX Blau LZ | Organic dye | Honeywell, Charlotte, NC |

Test Methods
Viscosity

Viscosity was measured using a Physica Rheometer MCR 301 device with a plate/plate system (diameter 15 mm) and a slit of 0.2 mm. Pre-shearing steps was done by applying a constant shear rate of 100 $s^{-1}$ for 120 seconds (s) followed by a decreasing shear rate from 100 $s^{-1}$ to 0.001 $s^{-1}$ (in 60 exponential decreasing steps). Finally, the viscosity values (Pas) were recorded at 23° C. for each shear rate (starting from 0.001 $s^{-1}$ to 1.000 $s^{-1}$ in 60 exponential increasing steps). For each shear rate, a delay of 5 s was typically used before collecting data. The above-mentioned method of measurement corresponds essentially to DIN 53018-1.

Insert Fabrication

An insert was designed via computer aided design (CAD), and parts of the assembly (except the sieve cloth) were 3D printed from polylactic acid (PLA) using a fused deposition modeling (FDM) printer (Anycubic Predator).

Preparation of Initial Photopolymerizable Composition

Example 1

A composition having the formulation of Table 2 was prepared. This corresponds to Example 6 in international patent application WO 2018/231583 (Herrmann et al.). The amount of the components is given in weight percent (%):

TABLE 2

|  | [weight %] |
|---|---|
| LUCIRIN TPO | 0.8050 |
| LUMILUX Blau LZ | 0.0020 |
| IONOL | 0.0407 |
| D-Zethacrylate | 59.5779 |
| DESMA | 6.5223 |
| HDK H-2000 | 2.5341 |
| SG-YBF 100 | 3.3879 |
| Zr/Si-Nanocluster | 27.1301 |

Viscosity measurements of the Example 1 initial photopolymerizable composition according to the Viscosity Test Method above gave the following results:

TABLE 3

| Example 1 | Shear rate 0.1 $s^{-1}$ | 1 $s^{-1}$ | 10 $s^{-1}$ | 100 $s^{-1}$ |
|---|---|---|---|---|
| Mean | 67.9 Pa s | 20.1 Pas | 8.0 Pa s | 5.0 Pas |

Printing

A three-dimensional printing production job of 1920 dental crowns having support structures was performed using the Example 1 initial photopolymerizable composition specified above, using a Rapid Shape D90 Triple Fine SLA Printer with automatic Platform Changer (Rapid Shape, Heimsheim, Germany). The printing parameters were as follows: Light energy of 100 $W/m^2$, 35 micrometer pixel size, 50 micrometer layer height, 1 s exposure time.

Collection of Fluid

Each of the 8 platform changer slots of the Rapid Shape D90 Triple Fine SLA Printer had a sheet of coated paper (3M ESPE Mixing Pad, 3M Oral Care, Seefeld, Germany) to collect uncured photopolymerizable composition dripping off the build plates after printing. Following the print job, the dripped material in the platform changer was collected from the coated paper with a silicone scraper in a collection container.

Insert Assembly

A piece of sieve cloth (63 micrometer mesh size, approximately 120×120 mm) was cut out of a roll/bulk with a pair of scissors. The first sieve cloth holder was placed in the insert body. Next, the piece of sieve cloth was placed on top of the sieve cloth holder. A second sieve cloth holder was placed on the sieve. On top of the second sieve cloth holder, the upper portion of the insert (e.g., removable sieve stabilizer) was attached. Next, the container for collecting the separated photopolymerizable composition (e.g., recycled material) was attached on the bottom side of the insert body. Then, 100 g of the fluid (e.g., polluted material) was provided in the upper portion of the insert. The whole assembly including the fluid was then weighed with a lab scale. A second insert was prepared in the same manner as just described. To avoid an imbalance during centrifugation, fluid was added in the second insert until the two assemblies had the same weight. The assemblies were then inserted in the centrifuge cups and placed in the centrifuge diametrically opposite each other.

Centrifugation

A Sigma 6-15 lab centrifuge (Sigma Laborzentrifugen GmbH, Osterode, Germany) was used for the centrifugation step. The balanced assemblies in the centrifuge were centrifuged at 350 rpm for 2 minutes. After the centrifugation, photopolymerizable composition from the upper portion of the insert was passed, due to centrifugal force, through the sieve cloth and into the container (e.g., a speed mixer cup) for the separated photopolymerizable composition (e.g., recycled material). The container with the separated photopolymerizable composition was then capped and labeled.

Preparation for the Next Centrifugation Run

All parts of the insert described assembly in FIG. 5 were disassembled and cleaned with alcohol. The used sieve cloth with the filter cake could be disposed of or washed with ethanol and reused.

Assessment of the Filter Cake

To examine the filter cake, the sieve cloth including the filter cake cloth was immersed in isopropyl alcohol (IPA) to wash the remaining resin away. After drying the filter cake in a fume hood, the solid contents of the filter cake were examined under a microscope. Typical contents were observed in the filter cake, namely tiny broken parts (e.g., pieces of support geometries), semi-cured residues, and lint, as described above with respect to FIG. 6.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method comprising:
   a) obtaining an insert comprising a sieve defining a plurality of openings each having a diameter of 10 to 200 micrometers, wherein at least a portion of the insert is disposed in a container configured to fit in a centrifuge;

b) placing a volume of a fluid in the insert, wherein the fluid comprises a photopolymerizable composition and a contaminant; and c) subjecting the volume of the fluid to a centrifugal force to separate the contaminant from at least a portion of the photopolymerizable composition by retaining the contaminant in the insert and passing at least a portion the photopolymerizable composition through the sieve of the insert and collected in the container to provide a separated photopolymerizable composition.

2. The method of claim 1, wherein the contaminant comprises at least one of an oligomer, a polymer, a dust particle, lint, a plurality of cured voxels formed from the photopolymerizable composition, or a part formed of a polymerized product of the photopolymerizable composition.

3. The method of claim 1, wherein the photopolymerizable composition exhibits shear thinning behavior.

4. The method of claim 1, wherein the separated photopolymerizable composition further comprises a particulate filler and the method further comprises d) subjecting the separated photopolymerizable composition to homogenization.

5. The method of claim 4, wherein the homogenization is performed under vacuum.

6. The method of claim 1, wherein step c) is performed at ambient pressure.

7. The method of claim 1, wherein the sieve is a first sieve and the insert further comprises a second sieve disposed adjacent to the first sieve, wherein the second sieve defines a plurality of openings each having a diameter that is smaller than the plurality of openings of the first sieve.

8. The method of claim 1, further comprising e) subjecting the separated photopolymerizable composition to additional centrifugation to remove at least a portion of a dissolved gas or gas bubbles from the photopolymerizable composition.

9. The method of claim 1, further comprising, prior to step a), f) selectively curing an initial photopolymerizable composition using actinic radiation to provide a three-dimensional object and the fluid comprising the photopolymerizable composition and the contaminant.

10. The method of claim 9, further comprising g) moving the three-dimensional object and thereby generating a mass inertial force in a portion of the fluid that is disposed on the three-dimensional object, wherein the mass inertial force is generated using a centrifuge, a shaker, or a mixer that spins along one or more axes.

11. The method of claim 1, further comprising i) analyzing the separated photopolymerizable composition for at least one of homogeneity or photoinitiator content.

12. The method of claim 1, further comprising j) placing at least a portion of the separated photopolymerizable composition into an additive manufacturing apparatus; and k) selectively curing the separated photopolymerizable composition in the additive manufacturing apparatus using actinic radiation to form a three-dimensional object.

13. The method of claim 12, further comprising, prior to step j) or step k), l) blending at least a portion of the separated photopolymerizable composition with a volume of an initial photopolymerizable composition.

14. A system comprising:
a) an additive manufacturing apparatus;
b) a centrifuge; and
c) an insert configured to be inserted in the centrifuge, the insert comprising a sieve defining a plurality of openings each having a diameter of 10 to 200 micrometers; and
d) a container, wherein at least a portion of the insert is disposed in a container configured to fit in the centrifuge.

15. The system of claim 14, wherein the container has a volume that is greater than a volume of at least the portion of the insert that is sized to fit in the container.

16. The system of claim 14, wherein the sieve is a first sieve and the insert further comprises a second sieve disposed adjacent to the first sieve, wherein the second sieve defines a plurality of openings each having a diameter that is smaller than the plurality of openings of the first sieve.

17. The system of any of claim 14, wherein the centrifuge comprises a sensor that measures imbalances and terminates centrifugal force if the imbalance is above a threshold amount or measures fill level in the insert.

\* \* \* \* \*